United States Patent
Simms, Jr.

[15] 3,671,952
[45] June 20, 1972

[54] APPARATUS FOR GENERATING AN ANGULARLY DISPLACEABLE MAGNETIC FIELD

[72] Inventor: Harold J. Simms, Jr., Flint, Mich.
[73] Assignee: General Motors Corporation, Detroit, Mich.
[22] Filed: Nov. 9, 1970
[21] Appl. No.: 87,846

[52] U.S. Cl................................340/177, 324/140, 340/210
[51] Int. Cl.............................................................G08c 19/04
[58] Field of Search....................................340/177; 324/140

[56] References Cited

UNITED STATES PATENTS

| | | | |
|---|---|---|---|
| 2,558,945 | 7/1951 | Fritinger | 324/140 |
| 2,787,736 | 4/1957 | Ellison | 324/140 |
| 3,302,191 | 1/1967 | Ziegler | 340/177 |
| 3,504,284 | 3/1970 | Grant | 324/140 |

Primary Examiner—Thomas B. Habecker
Attorney—Jean L. Carpenter and Paul Fitzpatrick

[57] ABSTRACT

A gauge circuit for producing an angularly displaceable magnetic field in accordance with conditions at a remote location. Three winding networks are connected at a common junction that is held at a predetermined voltage by a voltage regulator. One winding network generates a constant magnetic field while the other winding networks generate variable magnetic fields in accordance with their energization, which is controlled by transistors that are series connected with each of the other winding networks and are responsive to a voltage signal that is generated in accordance with the conditions at a remote location. The magnetic field generated by the winding networks combine to form the angularly displaceable resultant magnetic field oriented in accordance with the conditions being monitored.

12 Claims, 7 Drawing Figures

PATENTED JUN 20 1972 3,671,952

INVENTOR.
Harold J. Simms, Jr.
BY
Paul Fitzpatrick
ATTORNEY

APPARATUS FOR GENERATING AN ANGULARLY DISPLACEABLE MAGNETIC FIELD

This invention relates to air core gauges and, more particularly, to air core gauge circuits for generating a magnetic field that is angularly displaceable for use in an air core gauge in accordance with conditions at a remote location.

Devices known as air core gauges are presently in widespread use, particularly in monitoring various conditions in vehicles. These gauges generally employ several windings which are variably energized in accordance with the conditions being monitored. Since the conditions being monitored may be at a remote location relative to the air core gauge itself, these devices have proven to be very useful in advising a vehicle operator as to the status of various conditions in his vehicle. In operation, air core gauges generally employ several energized windings which each produce a magnetic field, the various magnetic fields combining to form a resultant magnetic field which is oriented in accordance with the energization of the various windings. A permanent magnet armature that is rotatably supported so as to be self-aligning with the resultant magnetic field is generally employed to indicate the orientation of the resultant magnetic field and hence the state of the conditions being monitored. The well-known automobile fuel gauge is but one example of the many applications in which air core gauges of this type are employed. Ziegler 3,302,191, a United States Pat. No., discloses an air core gauge of this type.

Even though air core gauges have been widely adopted to perform a variety of monitoring tasks, the search for an air core gauge design that provides optimum performance over a long period of time and is economical in construction is a continuing one.

Accordingly, it is an object of this invention to provide an air core gauge circuit that generates a magnetic field which is angularly rotatable over a range of substantially 240° in accordance with a single voltage signal.

It is another object of this invention to provide an air core gauge circuit that employs a voltage regulator to maintain a constant current through a winding that generates a constant reference magnetic field.

It is yet a further object of this invention to provide an air core gauge circuit which establishes a point of constant voltage, continuously energizes a winding connected between that point and ground, variably energizes certain windings which are connected between that point and ground, and variably energizes certain other windings which are connected between that point and a power source, the energization of the windings generating magnetic fields which combine to form an angularly displaceable magnetic field.

The foregoing and other objects and advantages of the subject invention will become apparent from the following description and drawings, in which.

Figure 1:
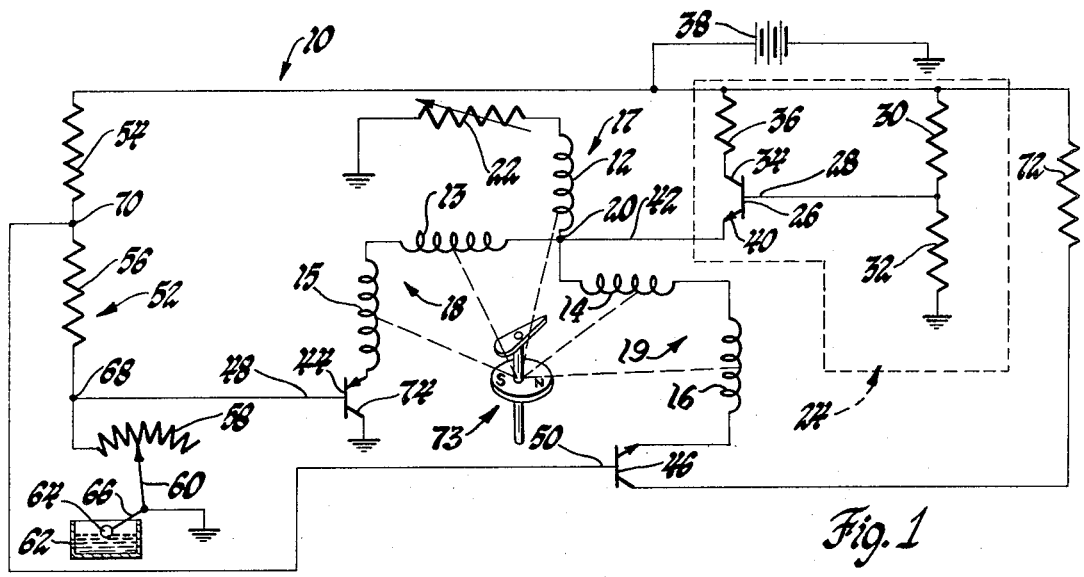
FIG. 1 is a schematic diagram of an air core gauge embodying the principles of the subject invention.

As shown in FIG. 1, a circuit 10 according to the principles of the subject invention includes a plurality of windings 12 through 16 which may be of the type employed in the aforementioned Ziegler patent. The windings 12 through 16 form three winding networks 17 through 19 that are connected at a common junction 20. The first winding network 17 includes the first winding 12 connected in series with a variable resistor 22, the purpose of which will later become apparent. The second winding network 18 includes the series combination of the second and fourth windings 13 and 15 while the third winding network 19 includes the third and fifth windings 14 and 16 connected in series.

The voltage of the junction 20 between the winding networks 17 through 19 is established by a voltage regulator network 24 that includes a voltage regulating transistor 26 having a base terminal 28 connected between a pair of bias resistors 30 and 32 and a collector terminal 34 connected through a current limiting resistor 36 to a suitable power source, such as a vehicle battery 38, which provides power for the voltage regulator 24 and the remainder of the circuit 10. While the battery 38 is illustrated as being a DC power source, the voltage across the battery 38 may vary widely as its charge is replenished by an electrical generating system (not shown) of a type widely used in vehicles. However, when the collector terminal 34 of the transistor 26 is connected to the battery 38 and the base terminal 28 is connected to the resistors 30 and 32, which serve as a voltage divider across the battery 38, the voltage at the emitter terminal 40 of the transistor 26 is maintained directly proportional to the battery 38 voltage regardless of the current through the transistor 26. By connecting the emitter terminal 40 to the junction 20 through the lead 42 the voltage at the junction 20 is also maintained at a fixed ratio of the battery 38 voltage by the voltage regulator network 24. Of course, if the battery 38 voltage is constant, the junction 20 voltage would also be constant, which shall hereafter be assumed in this description. Accordingly, since the junction 20 is held at a fixed voltage the first winding network 17, which is connected between the junction 20 and ground, generates a constant magnetic field of an intensity dependent upon the resistor 22 resistance.

The circuit 10 also includes first and second transistors 44 and 46 connected in series with the second and third winding networks 18 and 19, respectively, for controlling the energization of the windings 13 through 16, which generate varying magnetic fields in accordance with their energization. The bases 48 and 50 of the transistors 44 and 46 are connected to a voltage divider 52 that includes fixed resistors 54 and 56 and a variable resistor 58 that has a grounded wiper arm 60 which may be varied in accordance with conditions at a remote location. By way of example, the circuit 10 may be used to monitor fuel level in a fuel reservoir 62 by coupling a float 64 that is responsive to the fuel level in the reservoir 62 to the wiper arm 60 of the variable resistor 58 through a suitable linkage 66. By varying the fuel level in the reservoir 62 the resistance of the resistor 58 in the voltage divider 52 is changed. The voltage divider 52 therefore generates signals which vary in accordance with the fuel level in the remotely located reservoir 62. The two fixed resistors 54 and 56, rather than a single fixed resistor in series with the variable resistor 58, are provided so that the variations in the voltage across the resistor 58 may be detected at two junctions 68 and 70, to which the bases 48 and 50 of the transistors 44 and 46 are connected, for reasons soon to be described.

Accordingly, when the reservoir 62 is nearly empty and the wiper arm 60 of the variable resistor 58 is near the junction 68 the base-emitter junction of the first transistor 44 is forward biased so as to cause the first transistor 44 to become conductive. However, as the fuel level in the reservoir 62 is increased and the wiper arm 60 moves away from the junction 68 the resistance of the variable resistor 58 in the voltage divider network 52 increases, raising the voltage at the junction 68 until the base-emitter junction of the first transistor 44 is reverse biased and the first transistor 44 is turned off.

In a related fashion, when the reservoir 62 is full and the entire resistance of the variable resistor 58 is in the voltage divider network 52 the base 50 of the second transistor 46, which is connected to the junction 70, is at a higher voltage than that of the junction 20. The base-emitter junction of the second transistor 46 is thus forward biased and conducts a current through the third winding network 19 and a current limiting resistor 72 from the battery 38. However, as the fuel level in the reservoir 62 decreases and the resistance of the variable resistor 58 in the voltage divider 52 is decreased the voltage at the base 50 of the second transistor 46 is reduced until the second transistor 46 becomes non-conductive. To assure that the transistors 44 and 46 are not conductive at the same time the resistor 56 is connected between their respective base terminals 48 and 50, assuring that each is at a slightly different voltage than the other. A magnetized armature and indicator assembly 73 is located in the generated magnetic fields and is rotated in accordance with the resultant of the magnetic fields hereinafter described so as to indicate the fuel level in the reservoir 62.

The operation of the circuit 10 will now be explained with reference to the vector diagrams of FIGS. 2 through 6. To assure that energizing the windings 12 through 16 generates a rotating magnetic field the axes of the first, fourth, and fifth windings 12, 15 and 16 are positioned parallel to each other and at right angles to the axes of the second and third windings 13 and 14. In addition, the windings 12 through 16 are wound so that the constant magnetic field generated by the first winding 12 opposes those magnetic fields generated by the fourth and fifth windings 15 and 16 and so the magnetic fields generated by the second and third windings 13 and 14 oppose each other. These magnetic field relationships are illustrated in FIGS. 2 through 6 by vectors numbered so as to correspond to the respective windings 12 through 16 which generate each magnetic field. The resultant magnetic field, which is the vector sum of the various other magnetic fields, is illustrated by the vector R.

Since the strength of a magnetic field is proportional to the current through the winding which generates the field and the number of turns in the winding, as persons versed in the art will appreciate, the relative strengths of the magnetic fields may be predetermined for a given application merely by selecting the proper number of turns in each winding and controlling the currents through the windings. Accordingly, the vector diagrams of FIGS. 2 through 6 are presented only to illustrate relative intensities and orientations of the various magnetic fields.

Figure 2:
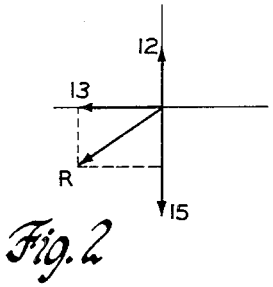
FIGS. 2 through 6 are vector diagrams representing magnetic fields generated by the apparatus of FIG. 1.

When the fuel reservoir 62 is empty the wiper arm 60 of the variable resistor 58 grounds the junction 68 and the base 48 of the first transistor 44. Since the first transistor 44 is of a PNP type in an emitter follower configuration, due to its having a grounded collector terminal 74, the first transistor 44 is saturated so as to be fully conductive when its base 48 is grounded. By being fully conductive the first transistor 44 effects maximum energization of the second and fourth windings 13 and 15. However, since none of the resistor 58 resistance is in the voltage divider 52 the junction 70 between the fixed resistors 52 and 54 is at a voltage considerably lower than that at the junction 20, which in a 12-volt vehicle system is held at approximately 6-volts by the voltage regulator network 24. Accordingly, the second transistor 46 is in a nonconductive, or cutoff, condition. Therefore only the first, second, and fourth windings 12, 13, and 15 are energized when the reservoir 62 is empty and the magnetic fields which they generate are as shown in FIG. 2.

Figure 3:
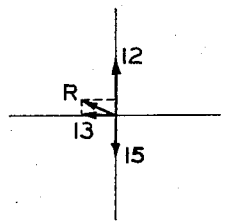

As the fuel level in the reservoir 62 is increased the resistance of the resistor 58 in the voltage divider 52, and hence the voltage drop across the resistor 58, is also increased. The resultant increase in voltage on the base 48 of the first transistor 44 moves the first transistor 44 out of saturation until, when the reservoir 62 is filled to about one-fourth its capacity, the conductivity of the first transistor 44 has decreased to the point where the magnetic fields generated by the second and fourth windings 13 and 15 are as illustrated in FIG. 3. Accordingly, increasing the fuel level in the reservoir causes the orientation of the resultant magnetic field, as illustrated by the vector R to be rotated clockwise to the angle illustrated in FIG. 3.

Figure 4:
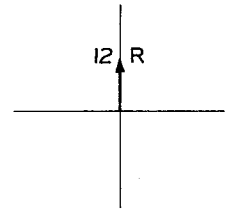
Figure 5:
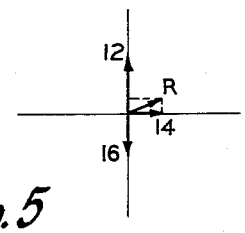
Figure 6:
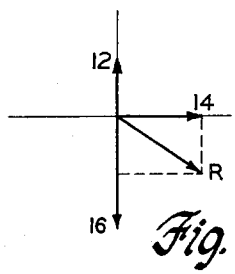

Further increases in the fuel level of the reservoir 62 cause the first transistor 44 to approach a cutoff condition. When the reservoir is approximately half full the first transistor 44 reaches the cutoff condition and the resultant magnetic field becomes identical to the constant magnetic field generated by the first winding 12, as shown in FIG. 4.

As the first transistor 44 reaches the cutoff condition the second transistor 46, which is of an NPN type, is on the verge of leaving its cutoff condition due to the increasing voltage being applied to its base 50 as the fuel level in the reservoir 62 increases. Accordingly, filling the reservoir 62 more than half full drives the first transistor 44 harder into cutoff while causing the second transistor 46 to become conductive due to the voltage at the base 50 of the second transistor 46 being raised higher than the voltage at the junction 20, which forward biases the emitter-base junction of the second transistor 46. When the reservoir 62 is approximately three-fourths full the conductivity of the second transistor 46 has increased sufficiently for the third and fifth windings 14 and 16 to generate the magnetic fields portrayed in FIG. 5, the resultant magnetic field illustrated as the vector R having been rotated still further in a clockwise direction.

By filling the reservoir 62 completely the resistance of the resistor 58 and the voltage divider 52 is increased sufficiently to cause the second transistor 46 to become saturated. When this occurs the third and fifth windings 14 and 16 generate magnetic fields of the relative intensity shown in FIG. 6 and the resultant magnetic field is rotated clockwise to its furthermost position, as shown by the vector R. While the current passing through the third and fifth windings 14 and 16 under these conditions also passes through the first winding 12, due to the cutoff condition of the first transistor 44, persons versed in the art will appreciate that the number of turns in the various windings need not be the same and may be changed to provide a different angular displacement of the resultant magnetic field. Similarly, changing the resistances in the circuit 10 will have the effect of changing the operating point of the various transistors so as to change the relative intensities of the magnetic fields, which would similarly have the effect of changing the orientation of the resultant magnetic field. The magnetized armature and indicator assembly 73 is oriented by the generated magnetic fields to a position determined by the resultant magnetic field to indicate the fuel level in the reservoir 62.

The aforedescribed embodiment of this invention may be employed satisfactorily in a number of applications. However, it has been observed that a linear change in the resistance of the resistor 58 in the voltage divider 52 causes a nonlinear change in the voltage that is applied to the bases of the transistors 44 and 46. While this nonlinearity is relatively small it may be desirable to assure that the voltage across the second winding network 18 when the reservoir is empty is the same as the voltage across the third winding network 19 when the reservoir 62 is full. Such uniformity may be achieved through using a nonlinear resistor as the resistor 58 or a nonlinear linkage as the linkage 66. Since nonlinear devices such as these are relatively expensive the circuit 10' of FIG. 7 has been designed to provide a relatively linear change in voltage at the bases of the transistors 44 and 46 in accordance with a linear change in the resistance of the resistor 58.

Figure 7:
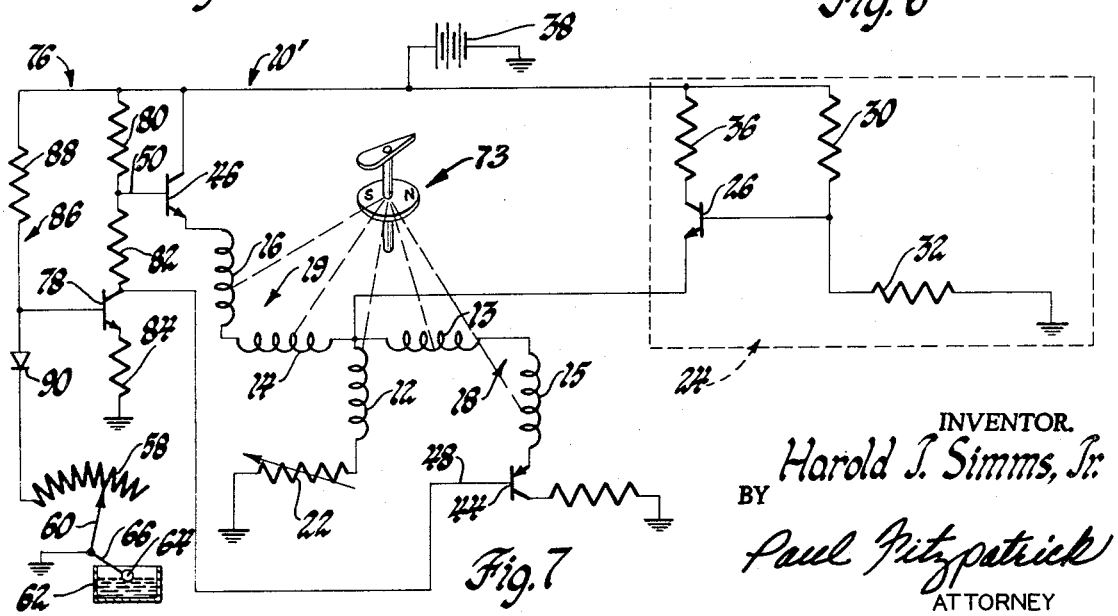
FIG. 7 is a modification of the schematic diagram illustrated in FIG. 1.

In FIG. 7 the voltage divider 52 of FIG. 1 is replaced with a voltage generating network 76 that includes a third transistor 78, bias resistors 80, 82, and 84, and a voltage divider 86 that includes a relatively large voltage dropping resistor 88, a diode 90, and the variable resistor 58. By selecting the voltage dropping resistor 88 to have a large resistance, on the order of 400 ohms, relative to the resistor 58, which varies from 0 to 90 ohms, the voltage that is obtained across the diode 90 and resistor 58 and is applied to the base of the third transistor 78 varies almost linearly as the resistance of the resistor 58 is varied in accordance with the fuel level in the reservoir 62. The diode 90 helps to assure substantially linear operation because when the resistor 58 is at 0 ohms the forward voltage drop across the diode 90 prevents the transistor 78 from being driven hard into a cutoff condition.

The bias resistors 80, 82 and 84 are selected so that with the resistance of the resistor 58 at 0 ohms the third transistor 78 is turned off and substantially the full voltage of the battery 38 is applied to the collector of the third transistor 78 and also to the bases of the first and second transistors 44 and 46. When the resistance of the resistor 58 is approximately 90 ohms the third transistor 78 is biased so as to have approximately one-fifth of the battery 38 potential on its collector terminal. Since the diode 90 has substantially the same forward voltage drop as the base-emitter junction of the third transistor 78 it is thus possible to operate the third transistor 78 without driving it hard into either saturation or cutoff. The third transistor 78 is thus very responsive to changes in the resistance of the resistor 58 and has a range of conductivity bounded at one extreme by a cutoff condition and limited at the other extreme by the bias resistors 80, 82, and 84.

In operation, the circuit 10' responds smoothly to the voltage across the resistor 58. When the reservoir 62 is empty the voltage at the base of the third transistor 78 is at a maximum and the third transistor 78 is turned on, placing a relatively low voltage on the bases of the transistors 44 and 46 so as to energize the second winding network 18 and deenergize the third winding network 19. When the reservoir 62 is full the resultant grounding of the third transistor 78 base turns off the third transistor 78, raising the voltage at the bases of the transistors 44 and 46 so as to deenergize the second winding network 18 and energize the third winding network 19. The bias resistor 82 is provided in the circuit 10', as was the resistor 56 in the circuit 10, to assure that the transition between the energization of the winding networks 18 and 19 is smooth. It does so by keeping the base 50 of the second transistor 46 at a slightly higher voltage than that applied to the base 48 of the first transistor 44, which assures that the transistors 44 and 46 are not both conductive at the same time. Since the circuit 10' operates in all other respects like the circuit 10 a further description of its operation is unnecessary.

It is thus apparent that I have devised new apparatus for generating a rotating magnetic field, the orientation of the magnetic field varying in accordance with conditions at a remote location. Of course, various obvious modifications of the apparatus herein described may be made without departing from the spirit of the invention. For example, the variable resistor 58 may be a thermistor or the voltage generated by the voltage divider 86 may be generated by a tachometer generator.

I claim as my invention:

1. Apparatus for generating a resultant magnetic field that is angularly displaceable in accordance with conditions at a remote location comprising, in combination, means for generating a constant magnetic field, a plurality of windings having a common junction and axes disposed at predetermined angles to each other, the windings generating magnetic fields when energized that combine with the constant magnetic field to form the resultant magnetic field, a point of reference potential, a power source, means energized by the power source for maintaining the junction at a substantially constant voltage relative to the reference potential point, means for generating a voltage signal in accordance with the conditions at the remote location, first control means responsive to the voltage signal and series connected between one of the windings and the reference potential point for variably energizing the winding in accordance with the voltage signal when the voltage signal is below a certain level, second control means responsive to the voltage signal and series connected between another of the windings and the power source for variably energizing said other winding in accordance with the voltage signal when the voltage signal is above the certain level, thereby varying the orientation of the resultant magnetic field in accordance with the conditions at the remote location, and means positioned in the magnetic fields and rotated thereby to an angular position related to the orientation of the resultant magnetic field.

2. The apparatus of claim 1 in which the first and second control means are transistors.

3. Apparatus for generating a resultant magnetic field that is angularly displaceable in accordance with conditions at a remote location comprising, in combination, first, second, and third winding means having a common junction and axes disposed at predetermined angles to each other, energization of the winding means generating magnetic fields which are directed along their respective axes and which combine to form the resultant magnetic field, a power source having a terminal connected to a point of reference potential, voltage regulating means connected between the power source and the junction for maintaining the junction at a substantially constant potential, means connecting the first winding means to the reference potential point effective to maintain the first winding means in a state of substantially constant energization so as to generate a substantially constant magnetic field, voltage generating means for generating a voltage signal in accordance with the conditions at the remote location, first control means connected between the second winding means and the point of reference potential for effecting variable energization of the second winding means in accordance with the voltage signal when the voltage signal is below a certain level, second control means connected between the power source and the third winding means for effecting variable energization of the third winding means in accordance with the voltage signal when the voltage signal is above the certain level, thereby varying the orientation of the resultant magnetic field in accordance with the conditions at the remote location, and means positioned in the magnetic fields and rotated thereby to an angular position related to the orientation of the resultant magnetic field.

4. The apparatus of claim 3 in which the first and second control means are transistors.

5. Apparatus for generating a resultant magnetic field that is angularly displaceable in accordance with conditions at a remote location comprising, in combination, a plurality of windings having a common junction and axes disposed at predetermined angles to each other, the windings generating magnetic fields when energized that combine to form the resultant magnetic field, a grounded power source, means energized by the power source for maintaining the junction at a constant voltage, means for connecting one of the windings to ground so as to continuously energize the winding, thereby generating a constant magnetic field, means for generating a voltage signal in accordance with the conditions at the remote location, first control means responsive to the voltage signal and series connected between another of the windings and ground for variably energizing at least the other of the windings when the voltage signal is below a certain level, second control means responsive to the voltage signal and series connected between yet another of the windings and the power source for variably energizing the last mentioned winding when the voltage signal is above the certain level, thereby varying the orientation of the resultant magnetic field in accordance with the conditions at the remote location, and means positioned in the magnetic fields and rotated thereby to an angular position related to the orientation of the resultant magnetic field.

6. The apparatus of claim 5 in which the first and second control means are transistors.

7. Apparatus for generating a rotatable magnetic field in accordance with conditions at a remote location comprising, in combination, first, second, and third windings, means connecting the windings to a common junction, a fourth winding series connected with the second winding, a fifth winding series connected with the third winding, the axes of the windings being disposed at predetermined angles to each other, a point of reference potential, a power source for generating a voltage other than that at the reference potential point, means powered by the power source for maintaining the junction at a predetermined voltage relative to the reference potential point, means connecting the first winding between the reference potential point and the junction effective to continuously energize the first winding with a constant current so as to generate a constant magnetic field, means for generating a voltage signal in accordance with the conditions at the remote location, a first controlled means having a control terminal and being series connected with the second and fourth windings between the junction and the reference potential point, a second controlled means having a controlled terminal and being series connected with the third and fifth windings between the junction and the power source, means for applying the voltage signal to the control terminals of the controlled means effective to variably energize the second and fourth windings when the voltage signal is below a certain level and variably energize the third and fifth windings when the voltage signal is above the certain level, the energized windings generating varying magnetic fields which combine with the constant magnetic field to form a rotatable magnetic field oriented in accordance with the conditions at the remote location, and means positioned in the magnetic fields and rotated thereby to an angular position related to the orientation of the rotatable magnetic field.

8. The apparatus of claim 7 in which the first and second controlled means are transistors.

9. Apparatus for generating a rotatable magnetic field in accordance with conditions at a remote location comprising, in combination, first, second, and third windings, means connecting the windings to a common junction, a fourth winding series connected with the second winding, a fifth winding series connected with the third winding, the axes of the windings being disposed at predetermined angles to each other, a point of reference potential, a battery connected to the reference potential point, a voltage regulator powered by the battery for maintaining the junction at a predetermined voltage relative to the reference potential point, means including a variable resistor for connecting the first winding between the reference potential point and the junction effective to continuously energize the first winding with a predetermined constant current so as to generate a constant magnetic field, means for generating a voltage signal in accordance with the conditions at the remote location, a first transistor connected in series with the second and fourth windings between the junction and the reference potential point and having a control terminal, a second transistor series connected with the third and fifth windings between the junction and the power source and having a control terminal, means for applying the voltage signal to the control terminals of the transistors effective to variably energize the second and fourth windings when the voltage signal is below a certain level and variably energize the third and fifth windings when the voltage signal is above the certain level, the energized windings generating varying magnetic fields which combine with the constant magnetic field to form a rotatable magnetic field oriented in accordance with the conditions at the remote location, and means positioned in the magnetic field and rotated thereby to an angular position related to the orientation of the rotatable magnetic field.

10. The apparatus of claim 9 in which the transistors are of opposite conductivity types.

11. The apparatus of claim 10 in which the first transistor is a PNP transistor, the second transistor is an NPN transistor, and the negative terminal of the battery is grounded.

12. Apparatus for generating a resultant magnetic field that is angularly displaceable in accordance with conditions at a remote location comprising, in combination, means for generating a constant magnetic field, a plurality of windings having a common junction and axes disposed at predetermined angles to each other, the windings generating magnetic fields when energized that combine with the constant magnetic field to form the resultant magnetic field, a point of reference potential, a power source, means energized by the power source for maintaining the junction at a constant voltage relative to the reference potential point, voltage generating means including a voltage divider having a diode in series with variable resistance means that are varied in accordance with the conditions at the remote location, a transistor having a predetermined range of conductivity bounded by certain limits, means connecting the voltage divider to the transistor effective to vary the conductivity of the transistor in accordance with the conditions at the remote location, first control means responsive to the conductivity of the transistor and series connected between one of the windings and the reference potential point for variably energizing the winding when the transistor is nearer one limit than the other limit of its conductivity range, second control means responsive to the conductivity of the transistor and series connected between another of the windings and the power source for variably energizing said other winding when the transistor is nearer said other limit than said one limit of its conductivity range, thereby varying the orientation of the resultant magnetic field in accordance with the conditions at the remote location, and means positioned in the magnetic fields and rotated thereby to an angular position related to the orientation of the resultant magnetic field.

* * * * *